UNITED STATES PATENT OFFICE.

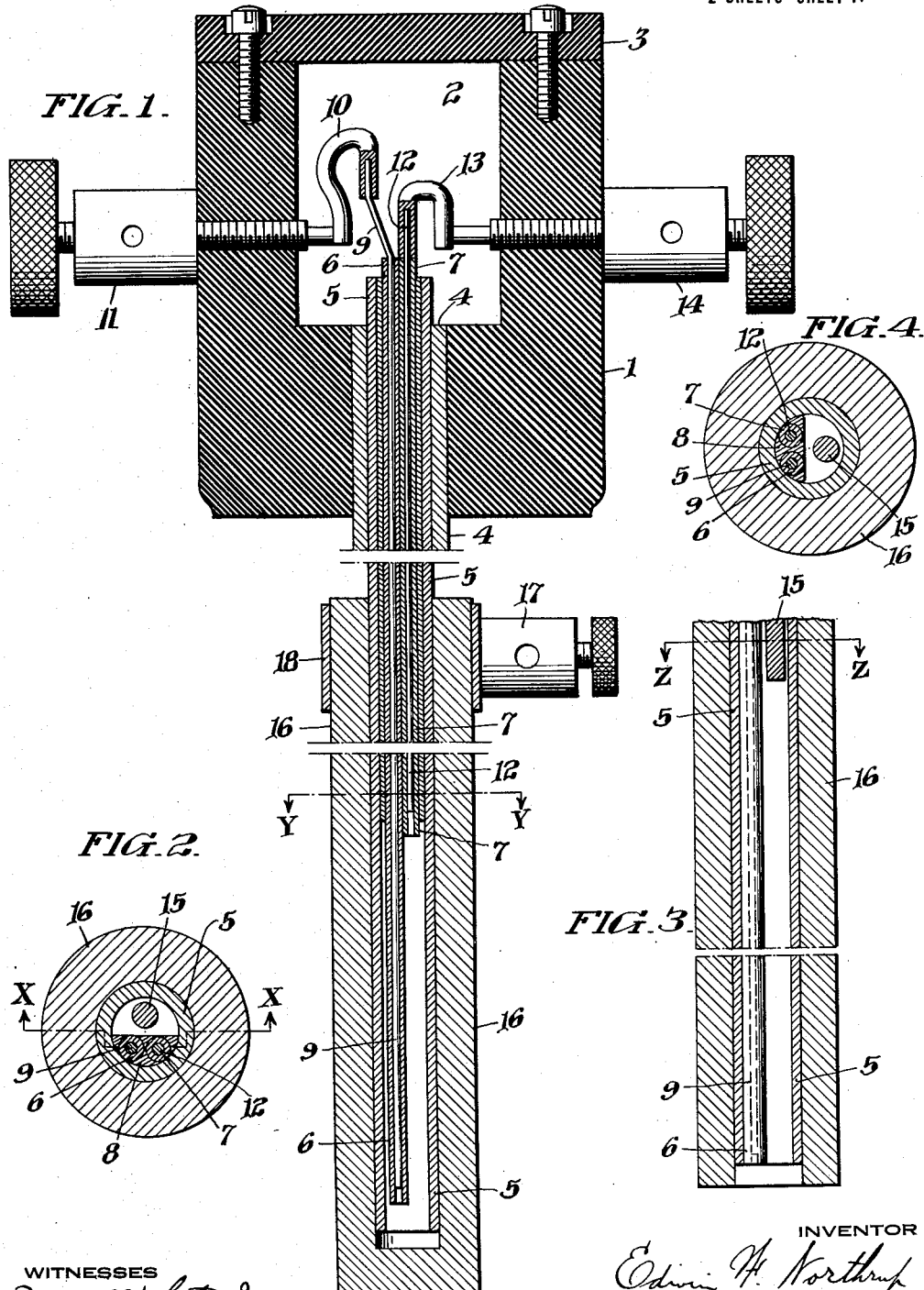

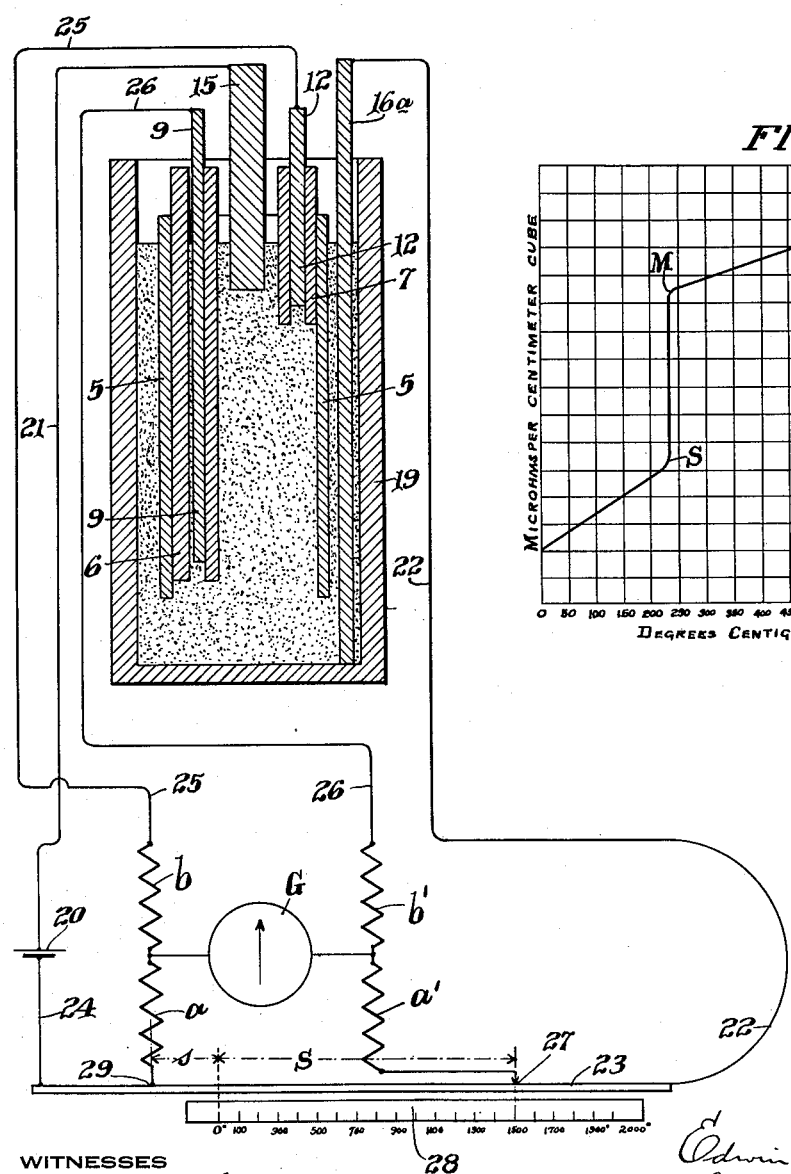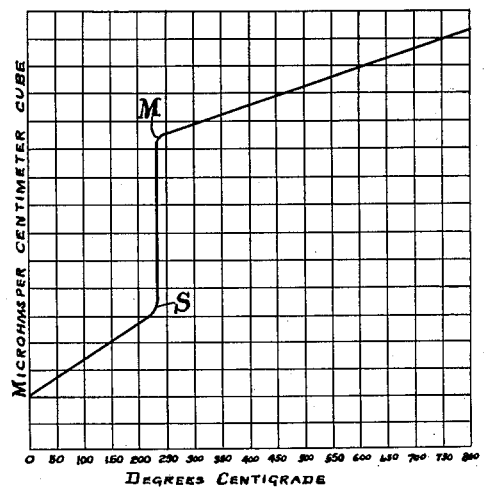

EDWIN F. NORTHRUP, OF PRINCETON, NEW JERSEY.

METHOD OF AND MEANS FOR MEASURING TEMPERATURE AND RESISTIVITY.

1,144,776.  Specification of Letters Patent.  Patented June 29, 1915.

Application filed October 3, 1914. Serial No. 864,739.

*To all whom it may concern:*

Be it known that I, EDWIN F. NORTHRUP, a citizen of the United States, residing in the city of Princeton, county of Mercer, and State of New Jersey, have invented a new and useful Method of and Means for Measuring Temperature and Resistivity, of which the following is a specification.

My invention relates to a method of and means for the accurate measurement of temperatures, and particularly very high temperatures, as, for example, 1600 degrees to 1800 degrees centigrade, more or less, though it will be understood that my invention is not limited to the measurement of such high temperatures, but is applicable also to the measurement of temperatures over wide ranges.

My invention resides in the method of and apparatus for measuring temperature and resistivity, particularly of molten materials, by recourse to a molten material through which current is passed and such observations taken that either the temperature of the molten material is determined if its resistance is measured, or its resistivity determined if its temperature is known.

As to one of its features, my invention employs a heretofore unutilized property of matter, that is, the practically linear or directly proportional change of resistance with temperature of some molten materials. This linear relation between resistance and temperature has been determined by me in the case of copper and tin from their melting temperatures to 1680 degrees centigrade, and there is reason to believe that the relation continues to be one of a directly proportional increase of resistance with the temperature up to the temperatures of vaporization of these metals. Besides these I have found that gold, silver, lead and bismuth, when molten, also obey this linear law.

My apparatus, which may be termed a liquid pyrometer and resistometer, takes, in its preferred form, the form of a vessel adapted to contain a molten material, with means for passing a current through a portion of the molten material and measuring the fall of potential in said material between predetermined points in a limited portion of the liquid mass.

When this apparatus is used as a pyrometer, the vessel will preferably be a closed one in which the material through which the current is passed is confined, the pyrometer being adapted to be plunged into the medium whose temperature is to be measured. And the apparatus may be employed for measuring resistivity of any molten substance, as a molten salt or metal, or of any conducting liquid, such as a liquid solution. In this case the resistometer may be plunged into the material whose resistivity is to be determined, the material being contained in a vessel or container of any convenient form.

My invention is not limited in all of its aspects to the employment in pyrometry of a material whose resistance increases in direct proportion to its temperature; but such material is a preferred one, and of the materials having this property I prefer to use tin, because tin melts at a relatively low temperature and does not vaporize below 2270 degrees centigrade, according to Greenwood; because it is cheap and is easily obtainable in very high state of purity; and because it lends itself to confinement without increase in volume in passing from the molten to the solid state.

When the metal tin is used in my liquid pyrometer, the following results, here approximately stated, are obtainable: It will measure temperatures indicated as a linear function of ohmic resistance from its melting point, 232 degrees centigrade, to at least 1680 degrees centigrade, and probably to 2000 degrees centigrade. When using it for measurement of temperatures above its melting point, where it displays the aforementioned linear relation between resistance and temperature, there may be used a suitably arranged temperature reading instrument or device having a uniform temperature scale, that is, a scale of temperatures in which equal distances anywhere along the scale correspond with equal temperature increments, and by such means the unknown temperature may be read directly in degrees centigrade or Fahrenheit, or any other suitable or desired units.

The accuracy of the readings of the tin pyrometer may always be approximately checked at one temperature, 232 degrees centigrade, without the use of any auxiliary device, because at that temperature an abrupt fall in resistance occurs upon solidification of the tin, and if such abrupt change occurs with gradual lowering of temperature when the reading instrument is indicating 232 degrees centigrade, then the apparatus is reading temperature correctly at and slightly above 232 degrees centigrade. And as the resistivity of a chemically pure metal in the molten state is a fixed constant at a fixed temperature, independent of the past physical history of the metal, and as the temperature coefficient is also a fixed quantity all pyrometers employing the same molten metal will always indicate in the same way. Hence, if the pyrometer is made to read correctly at a given temperature, it can be made to read correctly at all temperatures within its range simply by the proper adjustment of resistances which may be determined by calculation.

By simple means to be described, any number of liquid pyrometers using the same liquid material can be given the same resistance at any chosen temperature, and since they will all also have the same temperature linear coefficient, they can all be used interchangeably with a single temperature reading device or instrument and temperature scale, by switching any one into circuit at will. This type of pyrometer employing a molten metal as the temperature indicating means, is susceptible of wide variations in the choice of metal used, in size, in resistance at a given temperature, in form of construction, in nature of insulating materials used in its construction, and in the type, size, material, etc., of the protecting case employed for permitting the insertion of the pyrometer directly into the hot zone. In whatever ways the pyrometer may be modified in these respects, the underlying principle availed of is unaltered. This underlying principle, upon which rests a heretofore unutilized method of measuring temperature, consists in the measurement of temperature by measuring the resistance of any suitable inorganic compound or element when in the liquid or molten state.

The practical utilization of the above principle is made convenient, highly efficient and practical from the fact that several materials have low melting points and high boiling points and between these points change in resistance directly proportionally with change in temperature, by the especially convenient, simple and practical method of construction of the pyrometer element for direct insertion into the hot zone, and by the electrical means employed whereby the reading device or instrument, indicator, or autographic recorder used is made to read or display the temperature on a uniformly spaced scale, record sheet, etc., directly in degrees of temperature.

The same device, as will hereinafter appear, may readily be utilized to read or measure, as in microhms or ohms per centimeter cube, the resistivity of any liquid or molten material.

It will be understood that my apparatus may vary widely in forms and constructions and that there is herein described one of many forms my invention may take, the form illustrated being such as may be used in many relations, such as in a furnace having a reducing atmosphere, the description and illustration showing also how the structure may be used as a resistometer.

For such illustration reference is to be had to the accompanying drawings, in which:

Figure 1 is a longitudinal cross sectional view, some parts in elevation, through the pyrometer, taken on the line X—X of Fig. 2. Fig. 2 is a horizontal sectional view, on larger scale, taken on the line Y—Y of Fig. 1. Fig. 3 is a longitudinal sectional view of the lower end of a structure similar to that in Fig. 1, the section being taken at right angles to that of Fig. 1, and the bottom closure being omitted so that the device may be used as a resistometer. Fig. 4 is a cross sectional view taken on the line Z—Z of Fig. 3. Fig. 5 is a diagrammatic view showing a pyrometer operatively associated with a reading device or instrument, the latter, in this case, being a Kelvin double bridge. Fig. 6 is a typical resistivity-temperature curve of a material preferably used in the pyrometer.

Referring first to Fig. 6. The ordinates of the "curve" represent values of resistivity, while the abscissæ are temperatures in degrees centigrade. This curve is a reproduction of the resistivity-temperature curve for tin found in the paper by V. A. Suydan and myself at pages 153 et seq. of the *Journal of The Franklin Institute*, February, 1913. While this is the curve for tin, (but only carried a little beyond 800 degrees C.) it is similar, in the respects of interest here, with the curves for gold, silver, and copper as will be found upon reference to the said *Journal of The Franklin Institute* for June, March, and July, 1914. An inspection of this curve shows that the resistivity for tin in the solid state increases to the temperature of 232 degrees centigrade, its melting point, when the resistivity abruptly rises from the point S to the point M; and that the tin being now molten increases in resistivity directly proportionally with the increase in temperature from the point M upwardly to the right. It is this property of tin (and of certain other molten materials) of having a rectilinear relation between resistivity and temperature above the melting point that is of service in high temperature pyrometry.

Referring to Fig. 1, 1 is a head of fiber or other insulating material having the pocket or cavity 2 which may be closed by a cover 3 fastened by screws or otherwise. In a bore communicating with the cavity 2 is disposed a tube 4 of brass or other suitable material. Within the tube 4 is secured by cement or otherwise the tube 5 of suitable insulating material, preferably refractory insulating material such, for example, as Marquardt porcelain. Within the tube 5 are disposed two smaller tubes, 6, 7, preferably of similar refractory insulating material, which may be held in fixed relation with respect to the tube 5 by a refractory cement preferably at or near the top of the tube 5, the relative position of such cement being indicated at 8 in Fig. 2. The tube 6 extends preferably to within a short distance of the bottom of the tube 5 while the tube 7 is shorter and terminates at a greater distance from the bottom of the tube 5. Within the tube 6 and terminating near its bottom is a conductor 9, whose upper end is connected by conductor 10 to the binding post 11. Within the tube 7 is a similar conductor 12 connected by conductor 13 with the binding post 14, the binding posts 11 and 14 being carried by the head 1. Extending into the top of the tube 5 is a current conducting lead 15 which extends into the tube 5 to a point a little above the lower end of the tube 7, the conductor 15 communicating with a binding post, not visible, carried by the head 1.

Inclosing the tube 5 is a tube 16 of suitable refractory conducting material such as Acheson graphite. And a binding post 17 is in electrical communication with the tube 16 through the metallic band or ring 18.

Within the tubes 5 and 16 is confined a mass of molten material of the character hereinbefore referred to and which may be pure tin, the tin being present in sufficient quantity to bring its level somewhat above the lower end of the current lead 15.

The conductors 9, 12 and 15 are of metal of very high melting point and of such character that when immersed in the molten tin or other material used in the pyrometer they will not combine or alloy with the tin or other material. When the molten metal used within the pyrometer is tin, lead, antimony, bismuth, lead, copper, silver, gold, or some other metal not belonging to the iron group, either molybdenum or tungsten may be used for the conductors 9, 12 and 15. I have found that tungsten, not at all, and molybdenum only very slightly dissolve in molten tin up to a temperature of 1680° centigrade. Or for these conductors may be used presumably, tantalum or carbon. And both potential leads 9 and 12 should be of the same material.

Without limiting my invention thereto, but for purposes of illustrative example only, it may be stated that the pyrometer which I have made and used comprised a tube 5 of 30 centimeters length with an external diameter of about .7 centimeter and a bore of .5 centimeter. The conductors 9 and 12 were tungsten wire approximately No. 18 B and S gage. The lower end of the tube 7 was 6 centimeters above the lower end of the tube 6 and the tube 6 extended to within a fraction of a centimeter of the lower end of the tube 5, the conductors 9 and 12 extending to within a millimeter or two of the lower ends of the tubes 6 and 7. Such a pyrometer I used for measuring temperatures in one of my electric furnaces.

When the outer tube 16 is of graphite, the pyrometer may be used in any medium which will not cause oxidation of the graphite, that is, may be used in a reducing atmosphere. If it should be necessary to use the pyrometer in an oxidizing atmosphere, a protecting case of highly refractory material is slipped over the graphite tube 16. Such an outer casing may be of any suitable refractory material, such as "refrax" or "silfrax", now on the market, and capable of withstanding temperatures as high as 2000 degrees centigrade.

When it is remembered that tungsten melts at 3000 degrees centigrade, that tin boils at 2270 degrees centigrade, that graphite vaporizes at 3700 degrees centigrade and that "refrax" endures 2000 degrees centigrade, we see that a pyrometer, requiring only these materials, is available for measuring high temperatures by direct insertion of the pyrometer into the hot medium, and that such pyrometer is practical, inexpensive, and a means lending itself to the accurate measurement of high temperatures at temperature elevations heretofore unattainable by the direct insertion of a pyrometer into the hot medium. And it will be noted that noble metals or expensive materials are not required, and that the entire scale of temperatures can be calculated in advance by determining at room temperature the resistance of mercury filling the pyrometer, as hereinafter described. Furthermore, all pyrometers can be given the same selected resistance at the same temperature and hence can all be used in conjunction with the same scale of a single reading device or instrument. To give a number of pyrometers the same resistance it is only necessary to place mercury in all of them and to slightly raise or lower the one or the other of the tubes 6 or 7, preferably the shorter one, 7, these tubes carrying the potential leads, until the several pyrometers have the same mercury resistance. When such adjustments have been made the application of a little cement at the upper ends of the pyrometer will hold the potential terminal tubes firmly and permanently in the properly adjusted positions.

In use current from any suitable source, preferably direct current, is passed through the molten metal, for example, from the binding post 17 to the tube 16, with which the molten metal contacts at the bottom of tube 16, through the molten metal to the conductor 15 and thence back to the source of current. This current may be measured by any suitable device such as an ammeter. From a potential measuring device, such as a millivoltmeter, connections are made to the binding posts 11 and 14 to the potential terminals which are exactly at the lower ends of the tubes 6 and 7, the molten metal rising in these tubes sufficiently to contact with the conductors 9 and 12. By these means the resistance may be obtained of the column of molten material within the pyrometer between the exact points where the tubes 6 and 7 end in the molten material. This resistance of the column of molten material, designated by $R_t$, will be the potential difference or voltage V, read on the millivoltmeter, divided by the amperes, I, read on the ammeter. Thus:

$$R_t = \frac{V}{I} \quad (1)$$

and:

$$R_t = R_o + R_o ct \quad (2)$$

where $c$ is the temperature-resistance coefficient of the molten metal, 0.00057 in the case of tin, $t$ the temperature of the molten metal and $R_o$ the resistance the molten metal would have at 0 degrees if it continued to remain molten down to this 0 temperature and continued to obey the same linear law of change in resistance down to this same temperature. From equations (1) and (2) we have:

$$R_o + R_o ct = \frac{V}{I} \quad (3)$$

from which we have:

$$t = \frac{V - IR_o}{IR_o c} \quad (4)$$

We thus see that such a pyrometer may be used to read temperatures above the melting point and below the boiling point of the metal used therein.

In place of using an ammeter and millivoltmeter the resistance changes within the pyrometer may be read with any other suitable resistance measuring devices, such, for example, as a potentiometer or Wheatstone bridge. However, the Kelvin double bridge may be used to advantage. If the molten material is metal direct current, and if a salt alternating current would be used.

If the molten material is metal and the Kelvin double bridge is used, the connections are made as shown in Fig. 5.

In Fig. 5 the diameter of the pyrometer is exaggerated for purposes of clearness, and the tube 16 is represented by the graphite rod or metallic current lead 16$^a$, the other parts bearing reference characters similar to those of Figs. 1 and 2, and the molten metal being shown as contained in a vessel 19. The source of current 20 is connected by conductor 21 with the current lead 15 from which the current passes through the molten metal to the current lead 16$^a$ connected by conductor 22 with the slide rod 23 whose other terminal is connected by conductor 24 with the other terminal of the source 20. The potential terminals 12 and 9 connect respectively with the Kelvin bridge resistances $b$ and $b'$, through the conductors 25 and 26, respectively. The other terminal of the resistance coil $b$ connects through resistance coil $a$ to either a variable or fixed point upon the slide rod 23, in the case illustrated, to a fixed point. The other terminal of the resistance coil $b'$ connects through the resistance coil $a'$ with the movable contact 27 which engages the slide rod resistance 23, a scale 28 being associated with the pointer movable with the contact 27. The ratio coils of the Kelvin double bridge are formed by these resistance coils $b$, $a$, $b'$ and $a'$. The galvanometer G has one terminal connected between the coils $b$ and $a$ and its other terminal between the coils $b'$ and $a'$ in the well known manner.

If X is the resistance of the slide rod 23 between the points 27 and 29, and $R_t$ is the pyrometer resistance at temperature $t$, we have for a balance, when $b$ divided by $a$ equals $b'$ divided by $a'$ by construction, $$X = \frac{a}{b} R_t = \frac{a}{b}(R_o + R_o ct) \quad (5)$$

from which $$X = \frac{aR_o}{b} + \frac{aR_o ct}{b} \quad (6)$$

Put X equal to S+$s$, where $s$ is the portion of the slide rod between the point 29 and the point where O would be marked on the scale 28, and S the portion of the slide rod 23 between this O marking and the point 27, then we have:

$$S = \frac{aR_o}{b} - s + \frac{aR_o ct}{b} \quad (7)$$

Putting $b$ equal to $aR_o c$, we have:

$$S = \frac{1}{c} - s + t \quad (8)$$

Choosing $$s = \frac{1}{c},$$

the last equation, (8), reduces to S=$t$, which signifies that the bridge reads directly in degrees of temperature, the O on the scale being at the point where S=O, which may be read off on the scale 28. And when the metal or material in the pyrometer has the property of increasing in resistance in direct proportion to increase in temperature, the scale 28 will be uniformly divided in degrees of temperature. The resistances in the Kelvin bridge will assume more suitable values if we place $S10^6=t$, in which case we must place $$b = R_0 ca10^6$$

and $$s = \frac{10^{-6}}{c}$$

From the above it will be seen that the scale 28 may be computed in advance as to the distance between its divisions and may be constructed previously marked or engraved, without necessity for marking or calibrating after the apparatus is all assembled. And the foregoing equations show that the scale 28 may be computed in the above manner for any case where the material in the pyrometer has the linear law referred to.

I have found it still more convenient to maintain the resistance X fixed, and obtain a balance of the bridge by varying the two ratio coils $b$ and $b'$. The bridge when used in this way can also be made to read directly in degrees of temperature, a scale uniformly graduated in temperature or other increments coöperating with a pointer movable with the adjustable contact or rider.

While I have above referred to the use of direct current, it will be understood that I have used a source of alternating current in connection with an electro-dynamometer indicator with success. And where molten salts are used in place of molten metal alternating current should be used, in which case the Kelvin bridge with a detector of alternating current or the Kohlrausch or other methods of measurement may be employed. And alternating current is preferably used where any parasitic thermal or other electro-motive forces occur, or where the conducting mass is electrolytic in character.

The pyrometer structure is also available for use as a resistometer, that is, an instrument for determining the resistivity of a material, by having the tube 16 of Fig. 1 open at the bottom so that the device may be plunged into the material whose resistivity is to be determined. Such a resistometer is fragmentarily illustrated in Figs. 3 and 4. In Fig. 3 it will be seen that the bottom of the outer tube is open. The parts in Figs. 3 and 4 are similar to those in Figs. 1 and 2 as indicated by like reference characters.

The resistometer is plunged into the material whose resistivity is to be measured, and the temperature of such material is simultaneously noted, and when such material is a molten metal or high temperature material its temperature may be so simultaneously measured by inserting in it a pyrometer such as herein described.

The graphite tube 16, open at its bottom, as indicated in Fig. 3, may be omitted, and simply the tube 5 with the tubes 6 and 7 and conductor 15 may be plunged into the material, in which case the graphite rod $16^a$ or other current lead may be introduced into the material as indicated in Fig. 5. However, when the graphite tube 16 is employed it serves to protect the inner tube 5 from crushing should the bath of molten material solidify while the resistometer tube is immersed in it.

To obtain the resistivity of the molten material, for example molten brass or other metal, in microhms per centimeter cube, we proceed as follows: First plunge the resistometer into a bath of pure mercury and measure the resistance of the mercury within the resistometer tube between the two potential leads or points, the temperature of the mercury being simultaneously noted. We then have:

$$R_{mt} = K r_{mt} \quad (9)$$

in which $R_{mt}$ is the resistance of the mercury column within the resistometer at temperature $t$, $r_{mt}$ the known specific resistance of mercury at temperature $t$, and K is the constant of the resistometer depending upon the cross section of the mercury column and the distance between the potential leads 9 and 12 in the resistometer tube. The resistometer is now plunged into the bath and its temperature of the fluid simultaneously measured, as above stated. Then we have:

$$R_T = K r_T \quad (10)$$

in which $R_T$ is the resistance of the column of material in the resistometer at the temperature T simultaneously measured, $r_T$ is the required resistivity of the molten material at the temperature T, and K the same constant as in equation (9). Taking the ratio of equation (10) to equation (9) we have:

$$r_T = \frac{R_T}{R_{mt}} r_{mt} \quad (11)$$

and since $r_{mt}$ is a known constant and $R_{mt}$ is determined by a measurement we have $$\frac{r_{mt}}{R_{mt}} = A,$$

a known quantity. Then finally:

$$r_T = A R_T \quad (12)$$

From equation (12), A being known and $R_T$ being measured, as by apparatus shown in Fig. 5 or any other suitable resistance measuring apparatus, $r_T$, the resistivity of the molten metal or other material becomes known.

I have also shown in my published papers how it is possible to so select the resistances of a Kelvin double bridge that the constant A of equation (12) may assume a simple value as, $10^4$, which makes the bridge practically, to read the resistivity directly in microhms or ohms per centimeter cube on its scale.

What I claim is:

1. The method of measuring temperature higher than the vaporization temperature of mercury, which consists in subjecting to the temperature to be measured an inorganic material which is liquid at said temperature to be measured, and measuring the resistance of a portion of said liquid.

2. The method of measuring temperature higher than the vaporization temperature of mercury, which consists in subjecting to the temperature to be measured a predetermined confined mass of metal molten at said temperature, and measuring the resistance of said molten mass.

3. The method of measuring temperature, which consists in subjecting to the temperature to be measured a material which is molten at that temperature, and while molten changing in resistance directly proportionally to change in temperature, and measuring the resistance of said material.

4. In apparatus for measuring temperature higher than the vaporization temperature of mercury, the combination with a refractory vessel, of metal contained in said vessel and becoming molten at or below the temperature to be measured, and means for connecting a predetermined part of said metal in a resistance measuring circuit.

5. The combination with a pyrometer resistance for measurement of temperature higher than the vaporization temperature of mercury and having the property when molten of changing in resistance directly proportionally with change in temperature consisting of tin, of means for connecting said tin in a resistance measuring circuit.

6. The method of measuring temperature higher than the vaporization temperature of mercury, which consists in subjecting to the temperature to be measured a confined mass of metal molten at said temperature and having the property of changing in resistance directly proportionally with change in temperature, passing an electric current therethrough, establishing a balance between a difference in potential between separated points in said molten metal and a second difference in potential, and determining the unknown temperature directly from said second difference in potential.

7. The method of measuring temperature, which consists in subjecting to the temperature to be determined a confined mass of metal molten at that temperature and having the property of changing in resistance directly proportionally with change in temperature, and measuring the resistance of a portion of said confined metal.

8. The combination with a pyrometer resistance for measuring temperatures at which said resistance is molten consisting of tin, means for passing current through the molten tin, and means for measuring the drop of potential therein.

9. In apparatus of the character described, a tube, insulated conductors extending to different distances longitudinally within said tube, a liquid conductor within said tube contacting with said conductors, and current leads communicating with said liquid at points beyond the terminals of said insulated conductors.

10. In apparatus of the character described, a tube, a conducting tube inclosing the same, a mass of liquid conductor within said tubes and contacting with said second tube, insulated conductors extending to different distances within said first tube and contacting with said liquid, and a conductor contacting with said liquid within said tube, said insulated conductors contacting with said liquid at points between the contacts made with said liquid by said outer tube and said conductor.

11. In apparatus of the character described, a tube of refractory material, open ended tubes of different lengths extending different distances longitudinally of and within said tube, conductors within said tubes extending nearly to the ends of said tubes, a liquid within said first tube contacting with said conductors, and current connections to said liquid.

12. In apparatus of the character described, a vessel confining a conducting liquid having the property of changing in resistance directly proportionally with change in temperature, electrical connections with said material, and associated means for measuring the resistance of said material.

13. A pyrometer comprising a refractory vessel, metal therein adapted to become molten at or below the temperature to be measured, and electrical connections with said metal, said metal when molten having the property of changing in resistance directly proportionally with change in temperature.

14. A pyrometer comprising a refractory vessel, metal therein adapted to become molten at or below the temperature to be measured, said metal when molten having the property of changing in resistance directly proportionally with change in temperature, means for passing current through said molten metal, and potential terminals communicating with said metal.

15. In apparatus of the character described, an elongated refractory tube, a mass of metal contained in and adapted to become molten in said tube, refractory tubes of different lengths extending longitudinally into said first named tube from the same end thereof, and conductors adapted to be contacted by said metal disposed in said tubes and consisting of metal having a high melting point and having the property of not alloying with said metal when molten.

16. Temperature measuring apparatus comprising a refractory vessel, metal therein adapted to become molten at or below the temperature to be measured, said metal when molten having the property of changing in resistance directly proportionally with change in temperature, and an associated reading instrument for measuring the fall of potential in said metal, said instrument having a uniform scale reading in temperatures.

17. In apparatus of the character described, a vessel, metal adapted to become molten contained therein, conductors contacting with the molten metal, said conductors having high melting point and having the property of not alloying with said molten metal.

18. In apparatus of the character described, a refractory vessel, metal adapted to become molten therein, and conductors of tungsten communicating with said molten metal.

19. A pyrometer resistance comprising a mass of metal adapted to become molten at or below the temperature to be determined, said metal when molten having the property of changing in resistance directly proportionally with change in temperature.

20. A pyrometer comprising a container, tin constituting a pyrometer resistance in said container and becoming molten at or below the temperature to be determined, means for passing current through said tin, and a potential lead communicating with said tin.

21. A pyrometer comprising a container, tin constituting a pyrometer resistance in said container and becoming molten at or below the temperature to be determined, means for passing current through said tin, and a potential lead of tungsten communicating with said tin.

22. A pyrometer comprising a container, tin constituting a pyrometer resistance therein and becoming molten at or below the temperature to be determined, and tungsten current and potential leads communicating with said tin.

23. In apparatus of the character described, a tube, insulated conductors extending to different distances longitudinally within said tube from one end thereof, a conducting material within said tube contacting with said conductors, and current leads communicating with said conducting material at points beyond the terminals of said insulated conductors.

24. In apparatus of the character described, a graphite tube, a refractory tube within said graphite tube, a conducting material within said refractory tube contacting with said graphite tube, a current lead extending into said refractory tube in communication with said conducting material, refractory tubes of different lengths extending longitudinally within said first named refractory tube from the same end thereof, and conductors within said last named tubes contacting with said conducting material.

25. In apparatus of the character described, the combination with a tube of Marquardt porcelain, a metal in said tube, Marquardt porcelain tubes extending to different distances within said tube, potential leads in said last named tubes, and current leads to said metal.

26. In apparatus of the character described, the combination with a tube of Marquardt porcelain, a metal in said tube, Marquardt porcelain tubes extending to different distances within said tube, potential leads in said last named tubes, and current leads to said metal, one of said current leads consisting of a graphite tube surrounding said first named tube.

27. In apparatus of the character described, the combination with a tube of Marquardt porcelain, a metal in said tube, Marquardt porcelain tubes extending to different distances within said tube, potential leads in said last named tubes, and current leads to said metal, one of said current leads consisting of a graphite tube surrounding said first named tube, said first named tube and said graphite tube being open at their adjacent ends.

28. In apparatus of the character described, a refractory tube adapted to be plunged into liquid, current leads for passing current through the part of said liquid passing into said tube, potential leads contacting with said part of said liquid in said tube at separated points, an associated reading instrument for measuring the fall of potential between said points.

29. Temperature measuring apparatus comprising a resistance of molten metal having the property of changing in resistance directly proportionally with change in temperature, a reading instrument comprising a scale, a movable contact, a pointer movable with said contact over said scale, said scale being uniformly graduated in temperature units, and means for connecting said resistance in circuit with said instrument.

In testimony whereof I have hereunto affixed my signature in the presence of the two subscribing witnesses.

EDWIN F. NORTHRUP.

Witnesses:
W. S. NORTHRUP,
WM. C. VANDEWATER.